United States Patent
Kido

(10) Patent No.: US 6,617,263 B2
(45) Date of Patent: Sep. 9, 2003

(54) PATTERN FORMING METHOD FOR FLATTENING AN ORGANIC FILM FOR A LIQUID CRYSTAL DISPLAY DEVICE

(75) Inventor: Shusaku Kido, Izumi (JP)

(73) Assignee: NEC LCD Technologies, Ltd., Kanagawa (JP)

(*) Notice: Subject to any disclaimer, the term of this patent is extended or adjusted under 35 U.S.C. 154(b) by 0 days.

(21) Appl. No.: 10/189,571

(22) Filed: Jul. 8, 2002

(65) Prior Publication Data
US 2003/0012869 A1 Jan. 16, 2003

(30) Foreign Application Priority Data
Jul. 10, 2001 (JP) ......................... 2001-209410

(51) Int. Cl.⁷ .................. H01L 21/31; H01L 21/00; H01L 51/40
(52) U.S. Cl. ................. 438/780; 438/30; 438/781; 438/99
(58) Field of Search .................. 438/30, 162, 780, 438/781, 99

(56) References Cited

U.S. PATENT DOCUMENTS 6,388,271 B1 * 5/2002 Mitlehner et al.
6,420,200 B1 * 7/2002 Yamazaki et al.

FOREIGN PATENT DOCUMENTS

JP 7-120784 5/1995

* cited by examiner

Primary Examiner—John F. Niebling
Assistant Examiner—Stanetta Isaac
(74) Attorney, Agent, or Firm—Young & Thompson

(57) ABSTRACT

An organic film is coated on an insulating substrate and an organic solvent is infiltrated into the organic film to cause dissolution of the organic film to flatten the organic film. Thereafter, the flattened organic film is subjected to heat treatment at temperatures of 100 to 180° C. to evaporate the organic solvent included in the organic film. Evaporating the organic solvent included in the organic film at relatively low temperatures, i.e., temperatures of 100 to 180° C. makes it possible to reduce thermal stress on a wiring layer covered by the organic film and provide flatness of the surface of the insulating substrate.

13 Claims, 5 Drawing Sheets

PATTERN FORMING METHOD FOR FLATTENING AN ORGANIC FILM FOR A LIQUID CRYSTAL DISPLAY DEVICE

BACKGROUND OF THE INVENTION

1. Field of the Invention

The present invention relates to a method for flattening an organic film and a method for manufacturing a liquid crystal display device using the same. More particularly, the present invention relates to a method for flattening an organic film that flows a long distance with high controllability and a method for manufacturing an active matrix substrate (TFT substrate) of a liquid crystal display device using the method for flattening an organic film.

2. Description of the Related Art

In conventional technologies for flattening an uneven surface of a substrate having semiconductor devices formed thereon, there has been conceived a flattening method for coating an organic film on the uneven surface of the substrate and heating the organic film to fill concave due to the uneven surface of the substrate with the organic film to thereby flatten the uneven surface of the substrate.

Japanese Unexamined Patent Application Publication No. 7-120784 discloses an example using the above-mentioned flattening method and is explained with reference to a cross-sectional view shown in FIGS. 1A to 1C.

Referring to FIG. 1A, after a lower wiring layer 302 is formed on a glass substrate 301, polyamide acid is spin-coated on the glass substrate 301 to a film thickness of 0.1 to 1 μm to cover the lower wiring layer 302. Then, the polyamide acid film is heated at temperatures of 200 to 300° C. to be imidized, thereby forming an interlayer insulating film 303 consisting of a polyimide (refer to FIG. 1B). Subsequently, an upper wiring layer 304 is formed on the interlayer insulating film 303 and a polyimide film is formed to cover the upper wiring layer 304 in accordance with the same method as that employed to form the interlayer insulating film 303 to thereby constitute an insulating protective film 311 (refer to FIG. 1C).

As mentioned above, both the interlayer insulating film 303 and the insulating protective film 311 are formed by spin-coating polyamide acid solution on the associated surface. Therefore, the concaves of the uneven surface of the substrate due to the lower wiring layer 302 and the upper wiring layer 304 are filled with the polyamide acid to flatten the surfaces of the interlayer insulating film 303 and the insulating protective film 311.

However, after coating the polyamide acid by using the spin coater, the organic insulating film is subjected to heat treatment at temperatures of 200 to 300° C. for several tens minutes to one hour. In a case where the lower wiring layer and the upper wiring layer consist of aluminum, it has been found that problems associated with the heat treatment appears as hillock of aluminum. Moreover, the thermal reflow performed at temperatures over 200° C. imparts thermal stress to the underlying aluminum.

SUMMARY OF THE INVENTION

Accordingly, it is an object of the present invention to provide a flattening method for easily flattening an uneven surface of a substrate having an underlying film formed thereon by forming an organic film on the substrate and subjecting the organic film to a heat treatment at temperatures of 200° C. or less to cause reflow of the organic film, and a method for manufacturing a liquid crystal display device using the flattening method.

A method for flattening an organic film according to the present invention comprises the steps of forming an organic film on a surface of an insulating substrate and infiltrating an organic solvent into the organic film, and causing dissolution of the organic film to flatten the organic film.

The method for flattening an organic film according to the present invention is constructed such that the organic film is an organic material capable of dissolving into the organic solvent, the organic material is any one of acrylic, polyimide and polyacrylicamide, and the organic solvent includes at least one selecting from the group consisting of Alcohols, Ethers, Esters, Ketones, Glycols, Alkylene, glycols, Alkoxy alcohols and Glycol ethers.

The method for flattening an organic film according to the present invention is further constructed such that the organic film is subjected to heat treatment at temperatures of 100 to 180° C. to evaporate the organic solvent included in the organic film after the step for causing dissolution of the organic film to flatten the organic film.

As mentioned above, after coating a surface of the insulating substrate with the organic film, the organic solvent is infiltrated into the organic film to cause the dissolution of the organic film, thus flattening the organic film. Furthermore, after flattening the organic film, the heat treatment for evaporating the organic solvent included in the organic film is performed at relatively low temperatures, i.e., temperatures of 100 to 180° C. and therefore, the thermal stress applied to a material wiring layer as a lower layer covered with the organic film is reduced.

A method for manufacturing a liquid crystal display device according to the present invention is constructed as follows. That is, the liquid crystal display device is formed by disposing a TFT substrate and an opposing substrate facing each other and interposing a liquid crystal the TFT substrate and the opposing substrate. In this case, the TFT substrate is formed by the steps of forming a gate line and a gate electrode on a first substrate, forming a gate insulating film covering the gate line and the gate electrode on the first substrate, forming a semiconductor film on the gate insulating film and then, forming a source/drain electrode on the semiconductor film to connect the source/drain electrode to the semiconductor film, forming a protective film covering the semiconductor film and the source/drain electrode on the gate insulating film and forming a flattened film on the protective film, in which the step for forming a protective film is performed such that an organic film is coated on the protective film and an organic solvent is infiltrated into the organic film to cause dissolution of the organic film.

As described above, according to the method for forming the liquid crystal display device, the flattened film on the protective film of the TFT substrate is formed by infiltrating the organic solvent into the organic film to cause reflow of the organic film to flatten the organic film after coating the organic film on the protective film, and further, the organic film is subjected to heat treatment at relatively low temperatures, i.e., temperatures of 200° C. or less, thereby reducing thermal stress applied to wiring layers covered by the organic film.

DESCRIPTION OF THE PREFERRED EMBODIMENTS

Figure 1A:
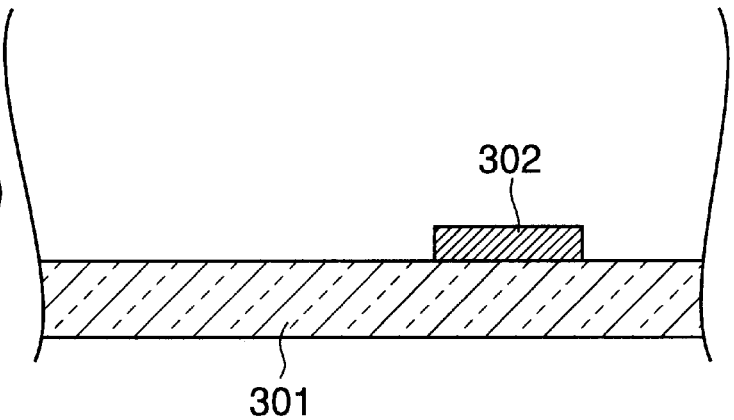
FIGS. 1A to 1C are cross-sectional views showing a conventional process for manufacturing a flattened film.
Figure 1B:
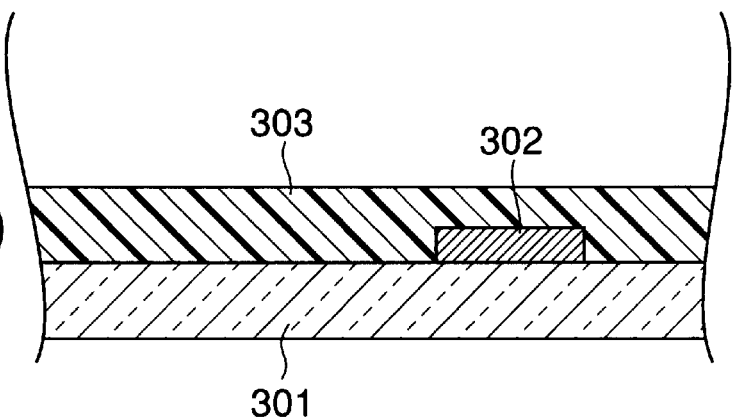
Figure 1C:
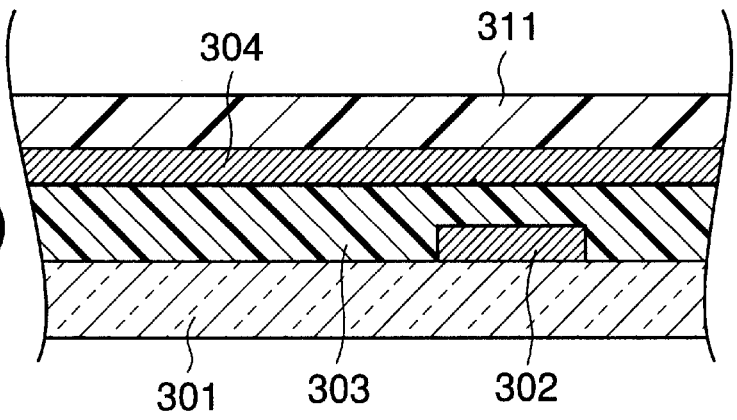
Figure 2A:
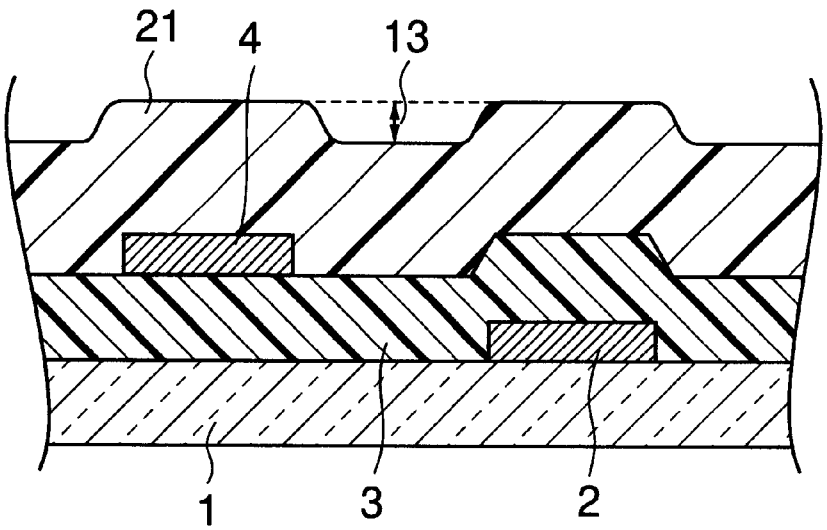
FIGS. 2A and 2B are cross-sectional views sequentially showing a process for manufacturing a flattened film according to a first embodiment of the present invention.
Figure 2B:
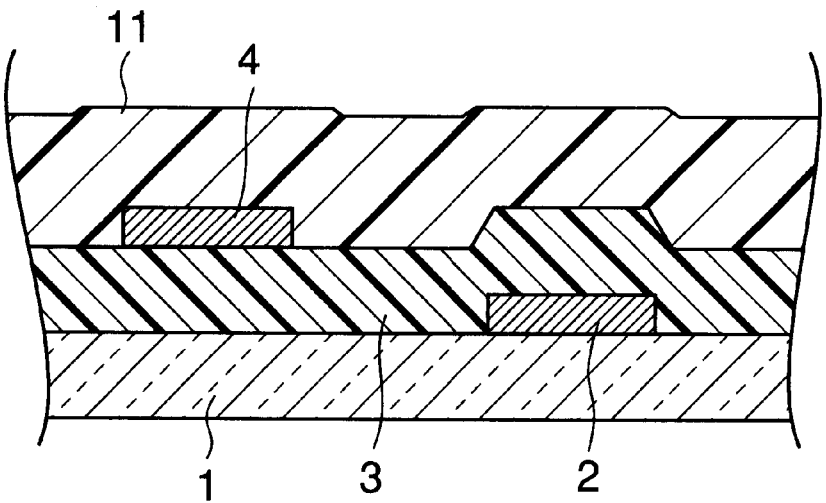

A first embodiment of the present invention will be described with reference to the drawings. FIGS. 2A and 2B are cross-sectional views illustrating a manufacturing process employed to form a flattened film on a surface of a two-layer wiring layer.

First, a lower wiring layer 2 is formed on an insulating substrate 1 and an interlayer insulating film 3 is formed, and then, an upper wiring layer 4 is formed on the interlayer insulating film 3. Subsequently, a coating film 21 containing resin materials such as acrylic and polyimide and having a film thickness of approximately 2 µm wiring layer is formed on the upper wiring layer 4 by spin-coating. In this case, the lower wiring layer 2, the interlayer insulating film 3 and the upper wiring layer 4 are formed so that a step 13 as an uneven portion on the coating film 21 due to the lower wiring layer 2 and the upper wiring layer 4 has a height of 500 nm.

The coating film 21 comprises an organic material soluble in an organic solvent or an inorganic material soluble in the organic solvent and is spin-coated on the insulating substrate 1.

The coating film 21 thus spin-coated is subjected to primary heat treatment at temperatures of 100 to 140° C., and is subjected to removal of water therefrom while a part of the organic solvent included in the coating film is 21 evaporated.

Thereafter, the insulating substrate 1 on which the coating film 21 is formed is exposed to an atmosphere of a vapor of the solution of the organic solvent. A vapor pressure employed in this step affects a rate at which the coating film flows. That is, when both temperature of the organic solvent and temperature of the insulating substrate are normal (at approximately 25° C.), the whole of the coating film 21 having a film thickness of approximately 2 µm flows caused by dissolution of the coating film due to the organic solvent, thereby changing the coating film 21 to an organic insulating film 11.

Since the vapor pressure varies depending on the organic solvent used for reflow of the coating film 21, the speed of reflow by the dissolution varies. When acetone or propylene glycol monomethyl ether is used as the organic solvent, the vapor pressure is high. Therefore, the coating film 21 is completely flattened after the film is being exposed to a vapor for 0.1 to 3 minutes. Contrary to it, when tripropylene glycol monomethyl ether or N-methyl-2-pyrrolidone is used, the film has to be exposed to a vapor for 5 to 20 minutes because the vapor pressure thereof is low.

Note that increase in temperature of the substrate relative to the temperature of the organic solvent forces the film to be exposed to a vapor for a long time to flow enough and on the contrary, decrease thereof relative to the same forces the film to be exposed to a vapor for a short time.

It should be appreciated that although the first embodiment employs, as the organic solvent, acetone, propylene glycol monomethyl ether, tripropylene glycol monomethyl ether, or N-methyl-2-pyrrolidone, the embodiment is not limited to the above solvents and therefore, may employ at least one of the following organic solvents. The above utilization of organic solvent in the embodiment can be applied to the following embodiments. In the following, the organic solvents are classified into a major classification of organic solvents and a minor classification of organic solvents in which the organic solvents classified into the major classification are described in detail (reference symbol R denotes an alkyl group or substitutional alkyl group, and reference symbol Ar denotes a phenyl radical or aromatic nucleus except for phenyl radical).

Organic solvents:
Alcohols (R—OH)
Alkoxy alcohols
Ethers (R—O—R, Ar—O—R, Ar—O—Ar)
Esters
Ketones
Glycols
Alkylene glycols
Glycol ethers Detailed examples of the above organic solvents:
$CH_3OH$, $C_2H_5OH$, $CH_3(CH_2)XOH$
Isopropyl alcohol (IPA)
Ethoxyethanol
Methoxyalcohol
Long chained alkylester
Monoethanolamine (MEA)
Acetone
Acetylacetone
Dioxane
Ethyl acetate
Butyl acetate
Toluene
Methyl ethyl ketone (MEK)
Diethyl ketone
Dimethyl sulfoxide (DMSO)
Methyl isobutyl ketone (MIBK)
Butylcarbitol
n-butyl acetate (nBA)
Gamma butyrolactone
Ethyl cellosolve acetate (ECA)
Ethyl lactate
Ethyl pyruvate
2-heptanone (MAK)
3-methoxybutyl acetate
Etylene glycol
Propylene glycol
Butylene glycol
Ethylene glycol monoethyl ether
Diethylene glycol monoethyl ether
Ethylene glycol monoethyl ether acetate
Ethylene glycol monomethyl ether
Ethylene glycol monomethyl ether acetate
Ethylene glycol mono-n-butyl ether
Polyethylene glycol
Polypropylene glycol
Polybutylene glycol
Polyethylene glycol monoethyl ether
Polydiethylene glycol monoethyl ether
Polyethylene glycol monoethyl ether acetate Polyethylene glycol monomethyl ether
Polyethylene glycol monomethyl ether acetate
Polyethylene glycol mono-n-butyl ether
Methyl-3-methoxypropionate (MMP)
Propylene glycol monomethyl ether (PGME)
Propylene glycol monomethyl ether acetate (PGMEA)
Propylene glycol monopropyl ether (PGP)
Propylene glycol monoethyl ether (PGEE)
Ethyl-3-ethoxypropionate (FEP)
Dipropylene glycol monoethyl ether
Tripropylene glycol monoethyl ether
Polypropylene glycol monoethyl ether
Propylene glycol monomethyl ether propionate
3-methoxy-methyl propionate
3-ethoxy-ethyl propionate Although the embodiment employs the method for exposing the coating film into the vapor of the organic solvent to cause reflow of the film, instead, the embodiment may employ a method for dipping the coating film in the organic solvent of extremely dilute concentration (for example, $\frac{1}{100}$ to $\frac{1}{1000}$). In a case where the method for dipping the coating film in the solution of the organic solvent of extremely dilute concentration is employed to cause reflow of the coating film, the organic solvent has to be made diluted into the solution to an extreme extent so that the organic solvent partially dissolves into the resist constituting the coating film while the resist does not dissolve into the organic solvent because the resist dissolves in the solution of the organic solvent and is removed when the concentration of the organic solvent is high.

In a case where the coating film is comprised of an organic material and an organic solvent, acrylic, polyimide, polyacrylamide or the like is used as the organic material. Instead of the combination of an organic material and an organic solvent, a combination of an inorganic material and an organic solvent may be employed to constitute the coating film. In this case, siloxane, polysiloxane, polysilane, polysilen, carbosilane, silicon or inorganic glass is used as the inorganic material.

Next, the method of reflow of organic film according to the embodiment will be described in detail.

Figure 3:
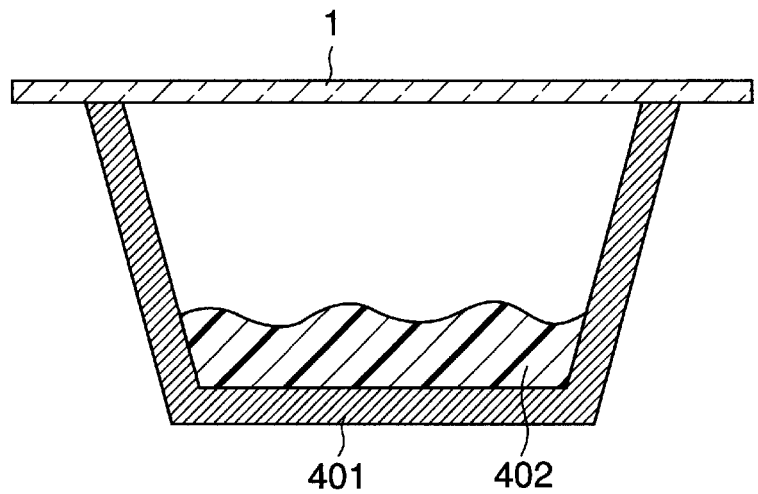
FIG. 3 is a cross-sectional view schematically showing an apparatus for exposing a substrate to a vapor, which is used in the present invention.

First, referring to FIG. 3, an organic solvent 402 such as N-methyl-2 pyrolidone is poured up to the depth of 10 mm in a stainless butt 401 20 mm deep and the insulating substrate 1 is put on the butt 401 such that the surface of the insulating substrate 1 to be exposed to a vapor faces the organic solvent 402. In this case, environment for processing the substrate 1 is made such that the temperature of the insulating substrate 1 is 24° C. and the temperature of the organic solvent 402 is ordinary (around 26° C.). Preparing the above-mentioned environment, the insulating substrate 1 is exposed to the vapor of the organic solvent.

In a state in which the organic solvent is infiltrated into the coating film, the coating film dissolves and flows (hereinafter, referred to as dissolution reflow). When the supply of the organic solvent is stopped, the organic solvent in the coating film is evaporated within a few tens seconds to a few minutes (depending upon the type of the organic solvent) and the coating film is solidified. It is also found that since the organic solvent is infiltrating into the coating film during reflow of the film, the coating film is swollen and the coating film restores its original volume after the organic solvent is evaporated therefrom.

The dissolution reflow of the coating film 21 begins at the upper layer of the coating film 21 in which the organic solvent is infiltrated and the dissolution reflow of the coating film at the upper layer thereof mainly contributes to the process for flattening the surface of the coating film 21.

In the first embodiment, although the flattening process is completed by only causing reflow of the organic insulating film 11, the following steps may be added to the flattening process. That is, after completion of flattening of the coating film, whole of the organic solvent or the like included in the organic insulting film 11 is substantially evaporated by subjecting the organic insulating film 11 to secondary heat treatment at temperatures of 150 to 180° C. for 60 to 300 minutes or to vacuum drying processing at temperatures of 100 to 150° C. for 30 to 60 minutes so as to enhance insulation performance of the organic insulating film as a flattened film.

Employing the flattening method constructed in accordance with the first embodiment reduces a step of 500 nm formed in a convex portion of the coating film to 40 to 60 nm after flattening of the coating film. In addition, since the coating film 21 is subjected to the heat treatment at temperatures of 100 to 140° C., hillock due to the thermal influence is not observed even in a case where the wiring layer under the coating film 21 is made of aluminum.

Since the viscosity of the coating film observed in the dissolution reflow performed in the present invention is lower than that observed by using the thermal reflow, a speed at which the coating film flows increases owing to the gravity of the film when the convex portion of the coating film dissolves, and the amount of flow is also increased. Accordingly, the dissolution reflow makes it possible to easily flatten the coating film while providing desirable flatness of the film and prevent the wiring layer from being affected by thermal treatment, which phenomenon is advantageous compared to that observed by using the thermal reflow.

In the first embodiment, as shown in FIG. 2A, the coating film 21 of a large film thickness and with high viscosity is formed so as to facilitate operation for reducing the degree of convex-concave of the coating film 21 as an underlying layer. Thereafter, when the coating film 21 is exposed to the vapor of the organic solvent, the organic solvent infiltrates into the surface of the coating film 21 and the organic solvent dissolves into the coating film 21. Consequently, the viscosity of a part of the upper portion on the coating film 21 decreases and the fluidity of the part thereof increases.

Since the speed at which the organic solvent infiltrates into the surface of the coating film 21 and the viscosity of the upper portion on the coating film 21 vary depending on the organic solvent to be used for reflow of the film, the speed at which the film flows and the depth of the film over which the film flows are controlled by selecting a preferable organic solvent and/or determining processing time during which the film flows in the reflow process. Employing optimal organic solvent and processing time makes it possible to make the upper portion of the film have high viscosity and obtain ideal flatness of the film.

It should be noted that an organic solvent, which boils at temperatures lower than 120° C. or has viscosity of less than 1.0, out of the above-described organic solvents, i.e., Acetone, Ethyl acetate, Methyl ethyl ketone (MEK), Methyl isobutyl ketone (MIBK), Propylene glycol monomethyl ether (PGME) or Propylene glycol monomethyl ether acetate (PGMEA) is most suitably used to cause reflow of the organic film to a larger extent.

Figure 4:
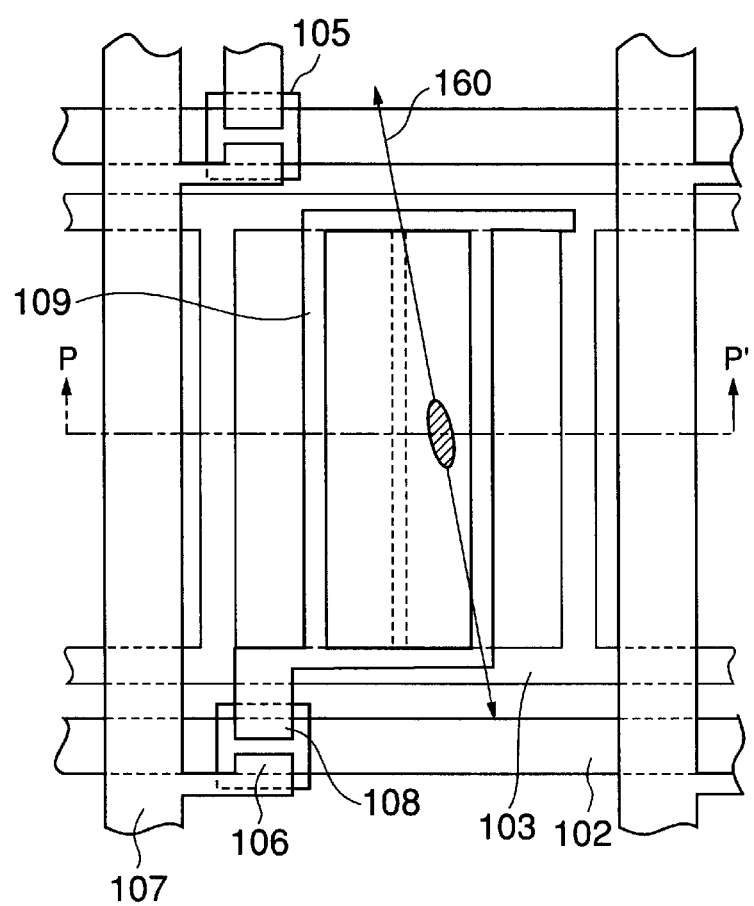
FIG. 4 is a plan view of a TFT substrate employed in a liquid crystal display device of a second embodiment of the present invention.
Figure 5:
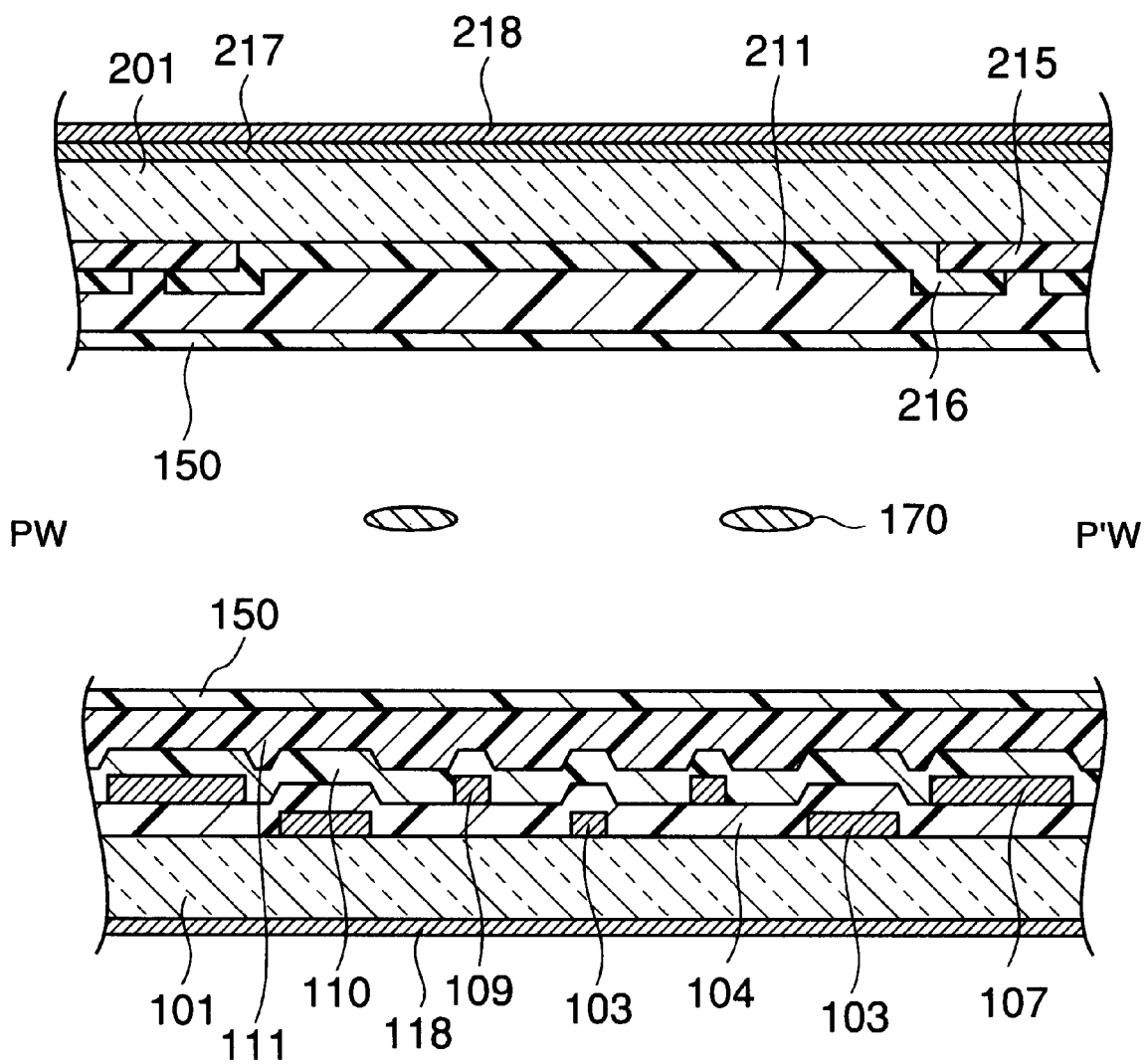
FIG. 5 is a cross-sectional view of the liquid crystal display device of the second embodiment of the present invention.

The second embodiment of the present invention will be described with reference to FIGS. 4 to 6C. The second embodiment describes a method for making surfaces of a TFT (Thin Film Transistor) substrate and a CF substrate (Color Filter) flat in a lateral electric field type liquid crystal display device. FIG. 4 is a schematic plan view of a TFT substrate when viewing the TFT substrate from the side of the CF substrate disposed opposite the TFT substrate. FIG. 5 is a schematic cross-sectional view of the liquid crystal display device taken across a plane perpendicular to the substrate, which plane includes the line P–P' shown in FIG. 4.

Both a gate electrode 102 and a common electrode 103 are formed on a first transparent substrate 101 consisting of a glass, etc., by patterning a Cr film.

An interlayer insulating film 104 consisting of SiNx and SiO$_2$ is formed covering an entire surface of the first transparent substrate 101*d*. An island-shaped semiconductor film 105 (refer to FIG. 4) made of an amorphous silicon is formed on the insulating film 104 and thereafter, a drain electrode 106, a data line 107, a source electrode 108, and a pixel electrode 109 are simultaneously formed thereon by patterning a Cr film.

Finally, a passivation film 110 is formed covering an entire surface of the uppermost layer of the first transparent substrate 101 to protect a back channel portion of the semiconductor film 105. Furthermore, a flattened film 111 is formed onto the passivation film 110 to obtain a TFT substrate 100.

A manufacturing procedure for forming a color filter substrate disposed facing the TFT substrate to color a transmissive light will be described below.

A black matrix 215 made of a resin including light shielding materials therein is formed on a second transparent substrate 201 consisting of a glass, etc., by patterning the resin. Subsequently, color layers 216 Red (R), Green (G) and Blue (B) are formed. Then, a flattened film 211 is formed covering an entire surface of the second transparent substrate 201, thus completing formation of the color filter substrate 200.

An alignment film 150 is printed on the TFT substrate 100 and the color filter substrate 200 formed as described above by a method such as offset printing. The alignment films 150 of TFT substrate 100 and the color filter substrate 200 respectively obtained as described above are subjected to rubbing to make molecules of the alignment films 150 align in a predetermined direction (in a rubbing direction 160), and a cell gap material is interposed between the two substrates, i.e., the TFT substrate 100 and color filter substrate 200, to make the two substrates apart a specific distance from each other, and then, a liquid crystal 170 is filled into a space therebetween.

Finally, a polarizer 118 is formed on another surface of the first transparent substrate 101, and a conductive film 217 and a polarizer plate 218 are formed on another surface of the second transparent substrate 201.

Figure 6A:
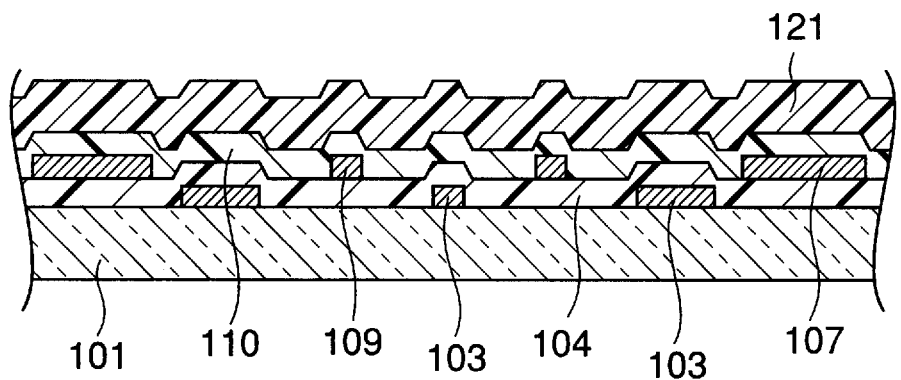
FIGS. 6A to 6C are cross-sectional views sequentially showing a process for manufacturing a TFT substrate employed in the liquid crystal display device according to the second embodiment of the present invention.
Figure 6B:
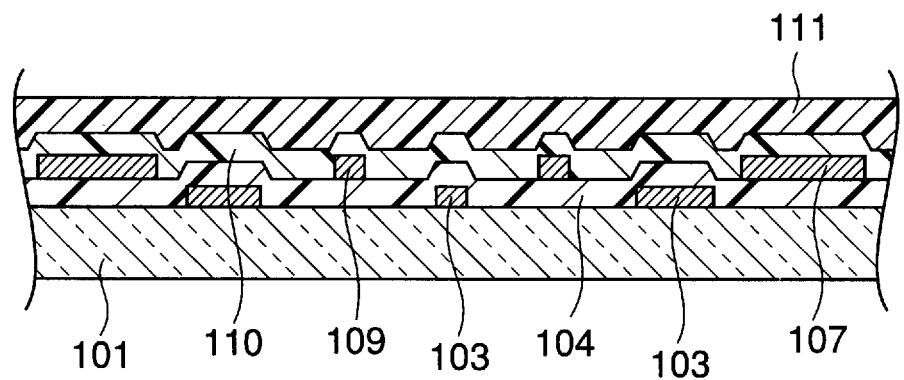
Figure 6C:
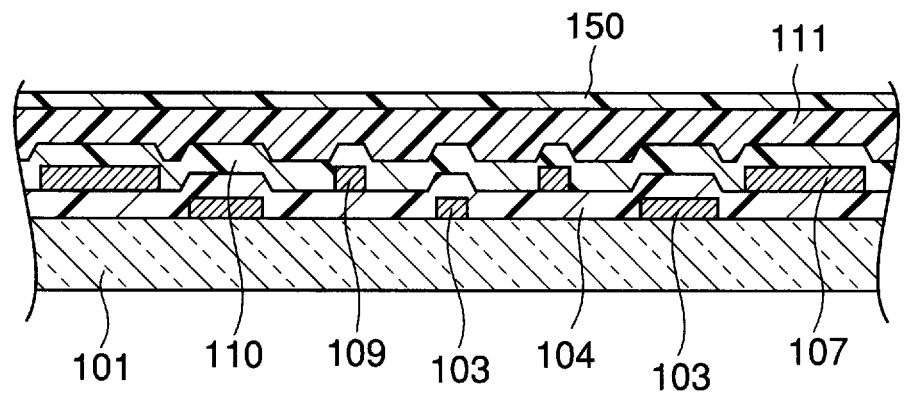

In the above-mentioned manufacturing procedure, the flattened film 111 on the TFT substrate 100 is formed in accordance with the manufacturing method shown in FIGS. 6A to 6C.

A coating film 121 consisting of a resin such as acrylic and polyimide is coated on a passivation film 110 to a film thickness of approximately 2 $\mu$m. In this case, steps having a height of approximately 500 nm and reflecting steps of the gate electrode 102, the common electrode 103, the island-shaped semiconductor film 105, the drain electrode 106, the data line 107, the source electrode 108, and the pixel electrode 109 under the coating film 121 (refer to FIG. 6A) are formed at the surface of the coating film 121.

The coating film 121 consists of an organic material soluble to an organic solvent or an inorganic material soluble to the organic solvent, and is formed by the spin coat method.

The coating film 121 formed by the spin coat method is subjected to primary heat treatment at temperatures of 100 to 140° C., to remove water therefrom and further, evaporate a part of the organic solvent included therein.

The TFT substrate 100 on which the coating film 121 is formed is exposed to a vapor of the solution of the organic solvent. In this case, a vapor pressure of the organic solvent affects a rate at which the coating film flows. That is, when both temperature of the organic solvent and temperature of the insulating substrate are normal (approximately 25° C.), the whole of the coating film 21 having a film thickness of approximately 2 $\mu$m flows (dissolution reflow), thereby changing the coating film 121 to a flattened film 111 (FIG. 6B). The dissolution reflow of the coating film 121 makes steps thereof have a height of 40 to 60 nm, thereby providing the flattened film with desired flatness.

When acetone or propylene glycol monomethyl ether is used as the organic solvent to flatten the coating film 121, the vapor pressure thereof is high and therefore, the coating film 121 is completely flattened after the film is being exposed to a vapor for 0.1 to 3 minutes. Contrary to it, when tripropylene glycol monomethyl ether or N-methyl-2-pyrrolidone is used, the film has to be exposed to a vapor for 5 to 20 minutes because the vapor pressure thereof is low.

In the second embodiment, although the flattening process is completed by only causing reflow of the organic insulating film 111, the following steps may be added to the flattening process. That is, after completion of flattening of the coating film, whole of the organic solvent or the like included in the organic insulting film 111 is substantially evaporated by subjecting the organic insulating film 111 to secondary heat treatment at temperatures of 150 to 180° C. for 60 to 300 minutes or to vacuum drying processing at temperatures of 100 to 150° C. for 30 to 60 minutes so as to enhance insulation performance of the organic insulating film as a flattened film (FIG. 6C).

Finally, an organic insulating film which is obtained by dissolving polyimide into the organic solvent is formed on the flattened film 111 by spin coating, thus forming an alignment film 150 (refer to FIG. 6C).

A flattened film 211 is formed on the color filter substrate 200 in the same manner as that employed to form the flattened film 111 on the TFT substrate 100, and the alignment film 150 is further formed on the flattened film 211.

As stated above, according to the method for manufacturing the liquid crystal display device of the present invention, the flattened film exhibits excellent flatness (with the step of 40 to 60 nm) by using the dissolution reflow of the coating film. Therefore, the entire alignment film which is formed on the flattened film is processed uniformly in the rubbing process, thereby preventing non-uniform rubbing due to high steps (having a height of about 200 nm) of the alignment film.

Although the organic material capable of dissolving into the organic solvent is employed as the coating film in the first and second embodiments, instead of it, a water-soluble material can be employed. In this case, any one of or compound comprised of two or more selected from the group consisting of polyacrylic acid, polyvinyl acetal, polyvinyl pyrrolidone, polyvinyl alcohol, polyethylenimine, polyethylene oxide, styrene-maleic anhydride copolymer, polyvinyl amine, polyallylamine, water-soluble resin containing oxazoline group, water-soluble melamine resin, water-soluble urea resin, alkyd resin and sulfonamide can be used as the water-soluble material. In a case where the water-soluble material is employed as the coating film, aqueous liquor including at least water as the chemical for dissolution reflow can be used dissolving the organic material into the organic solvent to cause reflow of the organic material, which phenomenon is observed using the organic solvent to dissolve the organic film into the organic solvent.

The methods for forming the coating film described in the first and second embodiments of the invention are applied to the method for manufacturing an electroluminescent display (EL), a field-emission display (FED), a fluorescent character display, an active element substrate of a plasma display panel (PDP) or a semiconductor substrate provided with an integrated circuit.

As described so far, according to the method for flattening the organic film and the method for forming the liquid crystal display device using the method for flattening the organic film, the organic solvent infiltrates into the organic film to cause reflow of the organic film (dissolution reflow). Thereafter, the organic film passed through dissolution reflow is subjected to heat treatment at temperatures of 200° C. or less, thereby completing processing for flattening the organic film. The organic film thus formed indicates an improved flatness and is processed at a temperature lower than that employed in the thermal reflow, preventing elements such as wiring layers and TFT from being affected by heat. In the liquid crystal display device, the organic film formed in accordance with the present invention exhibits excellent flatness of the organic film and therefore, can serve as a superior underlying layer for an alignment film. Furthermore, deforming the organic film in a lateral direction to a large extent and with high controllability makes it possible to apply the invented method for forming a flattened organic film to various technological fields that employ a substrate having convex-concave at its surface and need a flattened surface.

What is claimed is:

1. A method for flattening an organic film, comprising the steps of:

forming an organic film on a surface of an insulating substrate;

infiltrating an organic solvent into said organic film; and causing dissolution of said organic film to flatten said organic film.

2. The method for flattening an organic film according to claim 1, wherein said organic film is an organic material capable of dissolving into said organic solvent, said organic material is any one of acrylic, polyimide and polyacrylicamide, and said organic solvent includes at least one of following materials (R: alkyl group or substitutional alkyl group, Ar: one of phenyl radical and aromatic nucleus except for phenyl radical):

Alcohols (R—OH)
   Ethers (R—O—R, Ar—O—R, Ar—O—Ar)
   Esters
   Ketones
   Glycols
   Alkylene glycols
   Alkoxy alcohols
   Glycol ethers.

3. The method for flattening an organic film according to claim 2, wherein an organic solvent having any one of properties, a boiling point lower than 120° C. and a viscosity lower than 1.0, is selected as said organic solvent from said materials to be used in said step for forming an organic film.

4. The method for flattening an organic film according to claim 1, wherein said organic film is subjected to heat treatment at temperatures of 100 to 180° C. to evaporate said organic solvent included in said organic film after said step for causing dissolution of said organic film to flatten said organic film.

5. A method for manufacturing a liquid crystal display device, said liquid crystal display device being formed by disposing a TFT substrate and an opposing substrate facing each other and interposing a liquid crystal said TFT substrate and said opposing substrate, said TFT substrate being formed by the steps of:

forming a gate line and a gate electrode on a first substrate;

forming a gate insulating film covering said gate line and said gate electrode on said first substrate;

forming a semiconductor film on said gate insulating film and then, forming a source/drain electrode on said semiconductor film to connect said source/drain electrode to said semiconductor film;

forming a protective film covering said semiconductor film and said source/drain electrode on said gate insulating film; and forming a flattened film on said protective film, said step for forming a protective film being performed such that an organic film is coated on said protective film and an organic solvent is infiltrated into said organic film to cause dissolution of said organic film.

6. The method for manufacturing a liquid crystal display device according to claim 5, wherein a common electrode is formed on said first substrate together with said gate line and a pixel electrode is formed together with said source/drain electrode to constitute a part of said source/drain electrode and have comb-shaped electrodes formed in parallel with said common electrode.

7. The method according to claim 1, wherein the step of forming an organic film includes: coating an organic material on said insulating substrate and subjecting said organic material to a heat treatment.

8. The method according to claim 7, wherein said primary heat treatment is performed at temperatures of 100 to 140° C.

9. The method according to claim 1, wherein the step of causing dissolution of said organic film causing flowing of said organic film at an upper layer of said organic film, the flowing at the upper layer acting to flatten said organic film.

10. A method for flattening an organic film, comprising the sequential steps of:

forming an organic film on a surface of an insulating substrate;

after forming said organic film, infiltrating an organic solvent into said organic film; and causing dissolution of said organic film to flatten said organic film.

11. The method according to claim 10, wherein the step of forming an organic film includes: coating an organic material on said insulating substrate and subjecting said organic material to a heat treatment.

12. The method according to claim 10, wherein said primary heat treatment is performed at temperatures of 100° to 140° C.

13. The method according to claim 10, wherein the step of causing dissolution of said organic film causing flowing of said organic film at an upper layer of said organic film, the flowing at the upper layer acting to flatten said organic film.

* * * * *